United States Patent [19]

Finneran

[11] Patent Number: 5,108,386
[45] Date of Patent: Apr. 28, 1992

[54] SPRING AND CONTAINER WITH SPRING BIASED INNER CONTAINER INSERT

[75] Inventor: James G. Finneran, Vineland, N.J.
[73] Assignee: J. G. Finneran Associates, Vineland, N.J.
[21] Appl. No.: 550,137
[22] Filed: Jul. 9, 1990
[51] Int. Cl.⁵ ............................................. B01L 3/00
[52] U.S. Cl. .................... 604/403; 215/12.1; 220/446
[58] Field of Search ............... 220/506, 434, 446, 447; 215/12.1; 604/403-408; 222/230, 214, 511; 267/69, 70

[56] References Cited

U.S. PATENT DOCUMENTS

| | | | |
|---|---|---|---|
| 3,613,934 | 10/1971 | Leonard | 220/446 |
| 3,819,081 | 6/1974 | Runte | 220/447 |
| 3,915,359 | 10/1975 | Feldman | 222/514 |
| 4,094,641 | 6/1978 | Friswell | 215/12.1 |
| 4,830,217 | 5/1989 | Dufresne et al. | 215/12.1 |

OTHER PUBLICATIONS

MicroSun TM Limited-Volume Glass Inserts and Springs, Sun Brokers, Inc.-Mar. 1989, Catalog.
1100 Series-Limited Volume Inserts.
J. G. Finneran Assoc., Inc. Catalog-Jan. 1990.

Primary Examiner—Robert A. Hafer
Assistant Examiner—Kerry Owens
Attorney, Agent, or Firm—Ratner & Prestia

[57] ABSTRACT

A container for use in retaining laboratory or hospital samples with an upwardly biased and centered inner container or insert and a spring applicable for use with such a container.

9 Claims, 1 Drawing Sheet

SPRING AND CONTAINER WITH SPRING BIASED INNER CONTAINER INSERT

FIELD OF THE INVENTION

This invention relates to a container particularly useful for retaining laboratory or hospital samples. The container secures the sample within a limited volume inner container or insert, which facilitates handling and withdrawal of small fluid samples. The present invention is an improvement in such containers by which complete withdrawal of fluid sample is better assured.

BACKGROUND

Presently, small fluid sample containers often comprise limited volume inserts carried within outer containers and a spring which fits between the bottom of the insert and the bottom of the container to urge the insert upwardly against a closure cap and against the downward pressure of a fluid withdrawing instrument. The insert is typically a conical bottomed inner container, from which fluid sample is withdrawn by a hypodermic needle, syringe or miniature pipette. Upward biasing of the insert and the conical shape of the internal volume of the insert permits the fine needle or pipette to be pressed into the very bottom of the insert/inner container, without damage, to assure complete withdrawal of fluid sample therefrom.

In this conventional construction, the spring tends to be difficult to assemble, as well as a source of contaminants because of its separate manufacture and handling history. Further, the insert often becomes canted within the container assembly with the spring, as a result of which, the upward biasing action of the spring is lost or becomes less effective and the fine fluid withdrawal needle or pipette is deflected before reaching the bottom of the inner container, causing needle damage and less than fully effective withdrawal of fluid from the very bottom of the inner container.

BRIEF DESCRIPTION OF THE INVENTION

In the present invention, the limited volume insert is positioned and biased upwardly in the outer container by a circular spring, which is slid onto and secured on the outer surface of the insert preferably near the open end thereof and thus provides a centering function (i.e. maintaining the axial alignment thereof) to the insert as well as an axial biasing force. The insert is also free to move slightly downwardly (toward the closed end of the container) against the biasing action of the spring. Preferably, the spring includes a shoulder which mates with the top of the open end of the outer container. A cap which overlays the shoulder when the combination is assembled, presses it against the top of the outer container and prevents axial movement of the insert away from the bottom of the container.

Most preferably, the spring is a one piece molded resilient plastic device comprising two axially spaced circular elements, connected by at least one (and preferably three) helical members, all on a common axis. One of the circular elements, which is planar and perpendicular to the axis of the spring, is thereby adapted to be pressed downwardly against the top of the outer container. The other circular element is cylindrical and is thereby adapted to be mounted and securely retained on the outer surface of the insert, spaced somewhat from the shoulder. The spacing of the spring circular elements is such that with the cap pressing downwardly on the planar element of the spring and on the top of the insert, the planar circular element pressed against the top of the outer container, the spring is slightly extended from its relaxed position and the insert is thus biased upwardly toward the underside of the cap. The length of the insert is slightly less than the length of the internal volume of the outer container. Thus, the bottom or closed outer end of the insert is spaced from the inner bottom or closed end of the outer container to permit axial deflection thereof.

DETAILED DESCRIPTION OF THE INVENTION

Figure 1:
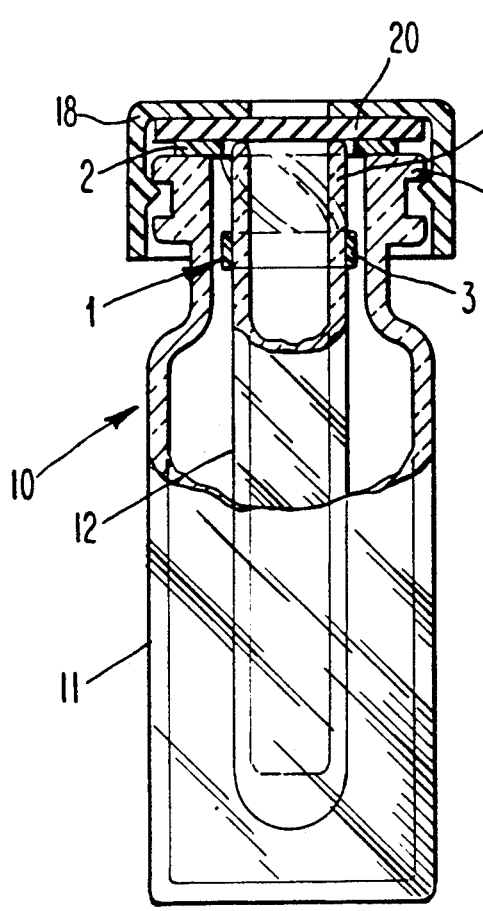
FIG. 1 is a partial cross-sectional view of a container, inner container insert and spring combination, comprising the preferred embodiment of the claimed invention.
Figure 2:
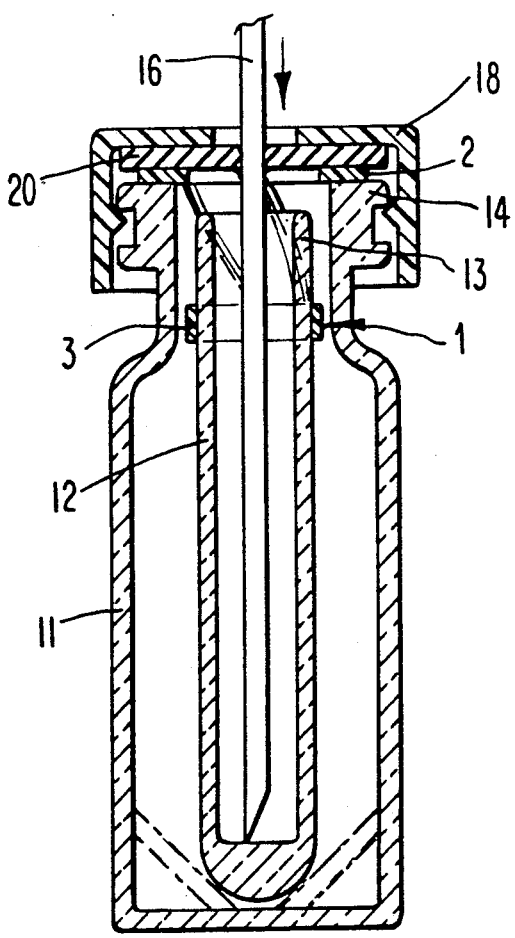
FIG. 2 is a cross-sectional view of the combination shown in FIG. 1, with a fluid withdrawal instrument deflecting the inner container downwardly.

As seen in FIGS. 1 and 2, the present invention in its preferred embodiment, comprises a combination 10 including an outer container 11 a limited volume inner container/insert 12, insert 12 being positioned and centered in container 11 by spring 1. Outer container 11 may be composed of glass or plastic and limited volume insert 12 similarly may be plastic or glass and may also include a conical bottom in its internal volume to better receive a fluid withdrawal instrument, such as that seen as needle 16 in FIG. 2. Cap 18 with liner-closure 21 presses a planar circular element 2 of spring 1 against the upper open end 14 of outer container 11. A cylindrical circular element 3 of spring 1 is securely retained on the outer surface of insert 12, near the upper (open) end 13 thereof, thus positioning and centering insert 12 in outer container 11. The flexibility of spring 1, however, permits insert 12 to be deflected downwardly, as shown in FIG. 2, first upon assembly with cap 18 and then upon insertion, through a top opening in cap 18 and penetration of liner-closure 20, of a fluid withdrawing instrument, such as a needle 16, which thus is permitted to press downwardly on the bottom of the internal volume of insert 12 (against the upward urging of spring 1 wanting to return to its relaxed starting position shown in FIG. 1) to effect maximum withdrawal of all of a fluid sample contained in insert/inner container 12.

Figure 3:
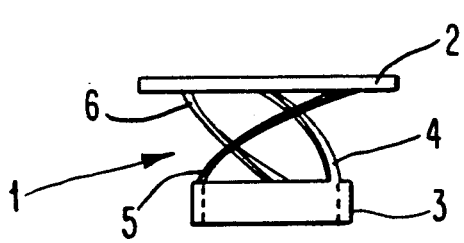
FIGS. 3 and 4 are side and perspective views, respectively, showing a spring which is one aspect of the present invention and which is also a part of the combination shown in FIGS. 1 and 2.
Figure 4:
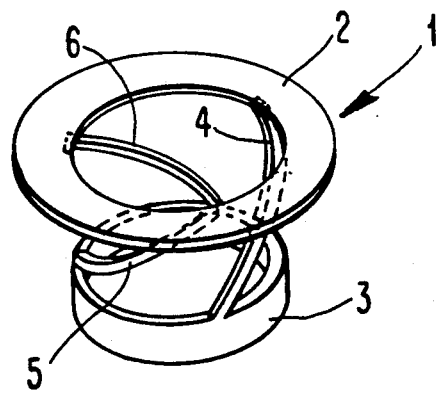

As better seen in FIGS. 3 and 4, spring 1 is a one piece molded device, preferably composed of a resilient plastic, which includes two circular elements 2 and 3 spaced apart along a common axis. Circular element 2 is substantially planar and perpendicular to the axis of the spring while circular element 3 is cylindrical, its inner diameter corresponding to the outer diameter of insert 12. Three connecting members 4, 5 and 6, follow a generally helical path around the common axis of circular elements 2 and 3 and connect at each end to one of the circular elements.

Circular element 2 of spring 1 extends horizontally, as shown in FIGS. 1, 2 and 3, encircling the top 13 of limited volume insert 12 such that circular element 2 sits on the top 14 of outer container 11 in assembled configuration. Circular element 3 of spring 1 extends vertically, as seen in FIGS. 1, 2 and 3, and is narrow compared to circular element 2. Element 3 contacts the surface of limited volume insert 12 in order to engage a firm hold on limited volume insert 12, thus provides the positioning and centering force on insert 12.

As shown, element 3 is typically mounted at a distance from the open end of insert 12 so that, with spring 1 in its relaxed configuration, element 2 is located beyond the end of insert 12. Alternatively, spring 1 may also be mounted in an inverted position at the bottom of insert 12, with element 3 spaced at a distance from the bottom of insert 12, such that element 2 projects axially beyond the bottom of insert 12 somewhat more than the distance of the desired spacing between the bottom of insert 12 and the bottom of outer container 11, which is otherwise dictated by the difference in length between insert 12 and the inner volume of container 11. In this latter configuration, deflection by needle 16 causes element 2 to press against the bottom of container 11 and spring 1 to resist such deflection.

In either case, the length of insert 12 is slightly less than that of container 11, so that cap 18, in assembled configuration, limits outward (away from closed bottom ends of container 11 and insert 12) axial movement of the open end of insert 12, and a slight axial space is provided between the bottoms of container 11 and insert 12 to allow for deflection as permitted by the spring biasing means interposed between container 11 and insert 12.

In practice, as seen in FIG. 2, spring 1 both centers and positions insert 12, while also permitting axial deflection of insert 12 toward the container bottom end and biasing limited volume insert 12 against that deflection. Therefore, needle 16 (which as previously indicated may be essentially any small fluid withdrawing instrument, including also capillary tubes and tips of analytical instruments) passes, protected from tip damage by the deflectability of insert 12 and the non-interference of insert 12 sidewalls maintained in their proper axial alignment, to the very bottom of limited volume insert 12 resulting in nearly 100% evacuation of the fluid in limited volume insert 12. The alternative conical shape at the bottom of the internal volume of limited volume insert 12 (shown in phantom) further assists in the substantially complete evacuation of the sample in limited volume insert 12. After removal of needle 16, spring 1 returns limited volume insert 12 upward to seal the upper edge 13 of insert/inner container 12 against cap 18.

Figure 5:
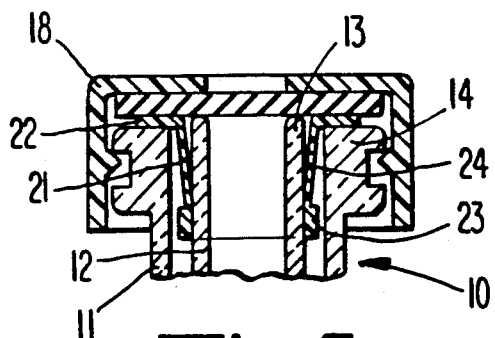
FIG. 5 is a cross-sectional view of the upper portion of a combination similar to that shown in FIGS. 1 and 2, with a different spring.

In FIG. 5 is shown an alternative embodiment in which spring 1 is replaced by spring 21, comprising a generally cylindrical sleeve, including a circular, planar element 22 at one end, a generally cylindrical element 23 at the other end and a central connecting frustoconical segment 24 therebetween, all sharing a common axis. As with spring 1, it is essential that spring 21 provide means for positioning centering and maintaining axial alignment of insert 12 in outer container 11, and for biasing insert 12 toward a preselected axial position relative to container 11 in their assembled configuration, specifically resisting axial deflection of insert 12 toward the closed bottom end of container 11 and biasing insert 12 against the inner surface of cap 18. Thus springs 1 and 21 must have sufficient resiliency in the axial direction to permit some deflection while providing the necessary biasing force and sufficient rigidity perpendicular to the spring axis to resist cross-axial deflection.

By way of example, spring 1 may be injection molded of polyethylene in a single piece, with the inner and outer diameters of the planar and cylindrical circular elements 2 and 3 being 0.205 inches and 0.312 inches (planar circular element) and 0.175 inches and 0.205 inches (cylindrical element), the height (dimension in the axial direction) of the cylindrical element is 0.060 inches and that of the planar element is 0.015 inches. The wall thickness of the helical members, like that of the cylindrical element, is also 0.015 inches.

While this invention has been disclosed with reference to specific embodiments, it is apparent that other embodiments and equivalent variations of this invention may be devised by those skilled in the art without departing from the true spirit and scope of this invention. The appended claims are intended to be construed to include all such embodiments and equivalent variations.

What is claimed is:

1. A container and container insert, both sharing a common axis and having an open end at one common axial end thereof and a closed end at the other common axial end thereof, and a spring for maintaining said insert in a centered and aligned position along said axis and for permitting deflection of said insert along said axis toward said common closed end while biasing said insert against said deflection, said spring comprising a first circular element and a second circular element spaced apart along said common axis, said elements connected by more than one connecting member, said members lying in a helical path about said axis located between said first and said second circular elements and connected at each end thereof to one of said first and second circular elements.

2. A container and container insert, as recited in claim 1, further including a cap overlying said open end of said container and limiting outward axial movement of the open end of said insert.

3. A container and container insert, as recited in claim 2, wherein said container is an outer container and said insert is a limited volume inner container, the over-all length of which is slightly less than that of said outer container, the internal volume of said inner container terminating in a conical closed bottom adapted to facilitate withdrawal of all fluid contained therein.

4. A container and container insert of claim 1, wherein said spring is composed of a single piece of resilient plastic.

5. A container and container insert of claim 1, wherein said first circular element is planar and generally perpendicular to said axis and said second circular element forms a cylindrical shape about said axis.

6. A container and container insert, as recited in claim 5, wherein said planar element of said spring is disposed axially beyond the open end of said insert, when said spring is relaxed, and said cylindrical element of said spring surrounds and is secured to said insert.

7. A container and container insert, as recited in claim 6, wherein said planar element of said spring is disposed axially beyond the closed bottom end of said insert and said cylindrical element of said spring surrounds and is secured to said insert.

8. A container and container insert of claim 1, wherein said circular elements are connected by three connecting members.

9. A container and container insert, both sharing a common axis and having an open end at one common axial end thereof and a closed end at the other common axial end thereof, and a spring for maintaining said insert in a centered and aligned position along said axis and for permitting deflection of said insert along said axis toward said common closed end while biasing said insert against said deflection, said spring having a planar circular member at one end thereof, a cylindrical element at the other end thereof and a frustoconical connecting member therebetween, all sharing a common axis and collectively having sufficient stiffness perpendicular to said axis to perform said centering function and sufficient resilience along said axis to perform said biasing function wherein said spring is composed of a single piece of resilient plastic.

* * * * *